United States Patent [19]

Liyanage et al.

[11] Patent Number: 5,677,480
[45] Date of Patent: Oct. 14, 1997

[54] METHOD AND SYSTEM FOR ASSESSING THE OPERATING CONDITION OF A PRESSURE REGULATOR IN A CORROSIVE GAS DISTRIBUTION SYSTEM

[75] Inventors: A. Nimal Liyanage, Ibaraki; Eiichi Ozawa, Chiba; Kazuo Yokogi; Jean-Marie Friedt, both of Tokyo, all of Japan

[73] Assignee: L'Air Liquide, Societe Anonyme pour l'Etude et l'Exploitation des Procedes Georges Claude, Paris, France

[21] Appl. No.: 393,684

[22] Filed: Feb. 24, 1995

[51] Int. Cl.⁶ ............................................ G01M 3/04
[52] U.S. Cl. ........................................... 73/46; 73/37
[58] Field of Search .......................... 73/49.2 R, 46, 73/4 R, 49.1, 3, 37

[56] References Cited

U.S. PATENT DOCUMENTS

| | | | |
|---|---|---|---|
| 4,430,886 | 2/1984 | Rood | 73/37 |
| 4,523,452 | 6/1985 | Brayman | 73/40 |
| 4,587,619 | 5/1986 | Converse, III et al. | 364/552 |
| 4,640,122 | 2/1987 | Héraud et al. | 73/39.2 |
| 4,715,214 | 12/1987 | Tveter et al. | 73/49.2 |
| 4,879,912 | 11/1989 | Suckow | 73/861.61 |
| 4,915,613 | 4/1990 | Landis et al. | 431/6 |
| 4,942,758 | 7/1990 | Cofield | 73/49.2 |
| 5,113,705 | 5/1992 | Earnhardt | 73/168 |
| 5,117,675 | 6/1992 | Notoyama et al. | 73/37 |
| 5,412,978 | 5/1995 | Boon et al. | 73/49.2 |
| 5,475,619 | 12/1995 | Sugano et al. | 364/558 |
| 5,493,902 | 2/1996 | Glidewell et al. | 73/119 A |

*Primary Examiner*—Michael Brock
*Assistant Examiner*—Jay L. Politzer

[57] ABSTRACT

A method of detecting a malfunction or failure of a pressure regulator in a corrosive or reactive gas distribution system while in use involves continuously measuring or monitoring the output pressure of the pressure regulator, both in the presence and the absence of gas flow. The onset of a malfunction of the pressure regulator can be predicted when the differential output pressure between flowing and non-flowing gas fluctuates highly and increases gradually. Failure of the pressure regulator or of the total system is detected when the differential output pressure in the presence and absence of flowing gas exceeds some experimentally determined value.

14 Claims, 3 Drawing Sheets

METHOD AND SYSTEM FOR ASSESSING THE OPERATING CONDITION OF A PRESSURE REGULATOR IN A CORROSIVE GAS DISTRIBUTION SYSTEM

FIELD OF THE INVENTION

The present invention relates to a method for detecting malfunctions or failures in pressure regulators used in corrosive gas distribution systems and a method for preventing such malfunctions or failures.

BACKGROUND OF THE INVENTION

Gas distribution systems, including inert and non-inert gas distribution systems, are used in a wide range of applications. Inert gases are not usually a problem for the various parts of a gas distribution system. However, non-inert gases, i.e., gases which may have a reaction with their environment, including reactive gases or corrosive gases, generate several problems related to their handling or transportation, particularly corrosive gases which may be very aggressive for their environment such as pipelines, valves, pressure regulators, etc. For example, corrosive HBr gas is used in the manufacture of semiconductors. In many manufacturing facilities, the corrosive HBr gas is stored in cylinders located in a cylinder cabinet outside the manufacturing facility. A gas distribution system is then provided to transport the corrosive gas to the appropriate place within the manufacturing facility.

The gas distribution systems typically include many components for gas flow control, e.g., pressure regulators and mass flow controllers. A statistical analysis of the origin of the failures in the corrosive gas distribution systems revealed that these components are the most frequent locations of malfunctions or failures. The general features of such a pressure regulator valve are illustrated in FIG. 1 and include an inlet 22, an outlet 24 and a diaphragm 26. A restricted orifice 28 is provided in the diaphragm and defines a seat 30. A poppet 32 biased by a poppet spring 34 and provided with a poppet cap 40 is designed to engage the seat 30 to thereby control or regulate the flow through the restricted orifice 28. A pressure adjustment knob 36 connected to a load spring 38 is also provided to effect adjustment of the pressure regulator 20.

When the pressure regulator malfunctions or fails, it is of course necessary to replace the pressure regulator. The malfunction or failure of the pressure regulator, as well as the subsequent replacement process, can lead to undesirable contamination of the process gas and possible failure of other components of the system. In addition, productivity losses in the manufacturing line inevitably result whenever a pressure regulator malfunctions, fails or requires replacement. Further, in some instances the malfunction or failure of the pressure regulator can result in the leakage of corrosive gases, thereby causing significant safety and environmental problems.

One of the major causes of the aforementioned malfunction or failure of the pressure regulators is the corrosion of and/or the deposition of corrosion products on the area of the poppet 32 at which the pressure drop occurs (i.e., in the area of the restricted orifice 28). Since the space between the outer surface of the poppet 32 and the seat 30 is on the order of a few microns, the outer surface of the poppet 32 must be very smooth to achieve proper leak tightness and to control secondary gas flow. The presence of even a slight amount of corrosion and/or deposition on the outer surface of the poppet 32 can prevent achievement of the necessary leak tightness and can result in the occurrence of a secondary gas leak when the regulator is in the closed position.

This type of internal leak in the pressure regulator can also arise due to corrosion of the poppet spring 34. Such corrosion can weaken the spring force of the poppet spring 34 and thereby inhibit the poppet 32 from fully engaging the seat 30 to close the restricted orifice 28.

In addition to the aforementioned internal leaks, pressure regulator malfunction or failure can result from external leaks. That is, the corrosive gas flowing through the pressure regulator can cause pitting corrosion (i.e., tiny holes) in the diaphragm 26 of the pressure regulator 20. This external leak can cause the leakage of corrosive gas directly to the surrounding environment.

It has been found that one of the major causes of corrosion in the gas distribution system which contributes to the aforementioned internal and external leaks of the pressure regulator is attributable to the cylinder exchange process. That is, when the cylinder containing the corrosive gas is empty, it is necessary to replace it with a full cylinder. If proper procedures are not followed during the replacement process, moisture from the atmosphere can invade the gas distribution system, thereby eventually leading to the presence of corrosion in the lines.

To avoid the potentially serious problems that can result from the malfunction or failure of a pressure regulator in a corrosive gas distribution system, the pressure regulators in the gas distribution system are typically replaced at specified intervals of time. The hope is that by replacing the pressure regulators at scheduled intervals, it will be possible to avoid situations in which the regulators fail. However, as can be appreciated, the regulators may experience corrosion problems that are more significant than expected, thereby raising the possibility that the regulators will fail prior to replacement. Moreover, scheduled replacements oftentimes result in the replacement of pressure regulators which are not malfunctioning or on the verge of failure. Consequently, costly replacements are made regardless of whether they are necessary.

OBJECT AND SUMMARY OF THE INVENTION

In view of the foregoing disadvantages and drawbacks associated with known non-inert, including corrosive gas, distribution systems, it would be desirable to provide a mechanism for identifying malfunctioning pressure regulators in a non-inert gas distribution system or for accurately predicting the breakdown of pressure regulators prior to complete failure. In accordance with one aspect of the present invention, a method of detecting malfunctions or failures of pressure regulators in a non-inert gas flow system, particularly a corrosive gas flow system, while in use includes the steps of flowing a non-inert or corrosive gas through a gas flow system which is provided with a pressure regulator, determining an operating output pressure of the pressure regulator in the gas flow system while the non-inert or corrosive gas is flowing through the system, continuously measuring the output pressure of the pressure regulator in the absence of the non-inert or corrosive gas flow through the system, and determining the existence of a malfunction or a failure of the pressure regulator when a pressure differential between the operating output pressure of the pressure regulator while the non-inert or corrosive gas is flowing through the system and the output pressure of the pressure regulator in the absence of gas flow exceeds a predetermined value.

Throughout this specification, the terms non-inert gases, reactive gases or corrosive gases will be used alternatively to designate the same type of gases which are capable of having a reaction, usually a chemical reaction, with their environment such as pipes, valves, pressure regulators or the like.

In accordance with a preferred embodiment, the existence of a malfunction of the pressure regulator is identified when the pressure differential exceeds a first predetermined value, and the existence of a failure of the pressure regulator is identified when the pressure differential exceeds a second predetermined value that is greater than the first predetermined value. In particular, a malfunction of the pressure regulator is identified when the pressure differential is between about 0.5 kgf/cm$^2$ and 1.0 kgf/cm$^2$. Further, the existence of a failure of the pressure regulator is determined when the pressure differential is greater than about 1.0 kgf/cm$^2$.

In accordance with another aspect of the present invention, a method of assessing the operating condition of a component, such as a valve, a mass flow controller or a similarly designed component, in a gas flow system includes flowing gas through a line of a gas flow system which contains such a component for regulating flow through the line, monitoring an output pressure adjacent an outlet of the component during flow of gas through the line and in the absence of gas flow through the line and determining the operating condition of the component on the basis of changes in the outlet pressure of the component in the absence of gas flow through the component.

In accordance with the preferred embodiment, the existence of an external leak in the component is determined when the outlet pressure decreases during the absence of gas flow through the line. If the pressure differential between the outlet pressure of the component when gas is flowing through the line and the outlet pressure of the component in the absence of gas flow exceeds a first predetermined value, it is determined that the component is malfunctioning. On the other hand, if the pressure differential between the outlet pressure of the component when gas is flowing through the line and the outlet pressure of the component in the absence of gas flow exceeds a second predetermined value which is greater than the first predetermined value, it is determined that the component has failed.

According to a more general aspect, the invention relates to a method of assessing the existence of an external leak in a component having at least an open position where gas flows and having at least one closed position where gas does not flow, comprising the step of determining a decrease of the outlet pressure of the gas from the component, which is in closed position, while the gas under pressure is present on the inlet side of said component, compared to the pressure of the gas when the component is in open position.

BRIEF DESCRIPTION OF THE DRAWING FIGURES

The foregoing features of the present invention, in addition to others, will become more apparent from the detailed description set forth below considered in conjunction with the accompanying drawing figures in which like elements are designated by like reference numerals and wherein.

DETAILED DESCRIPTION OF THE PREFERRED EMBODIMENT

Figure 2:
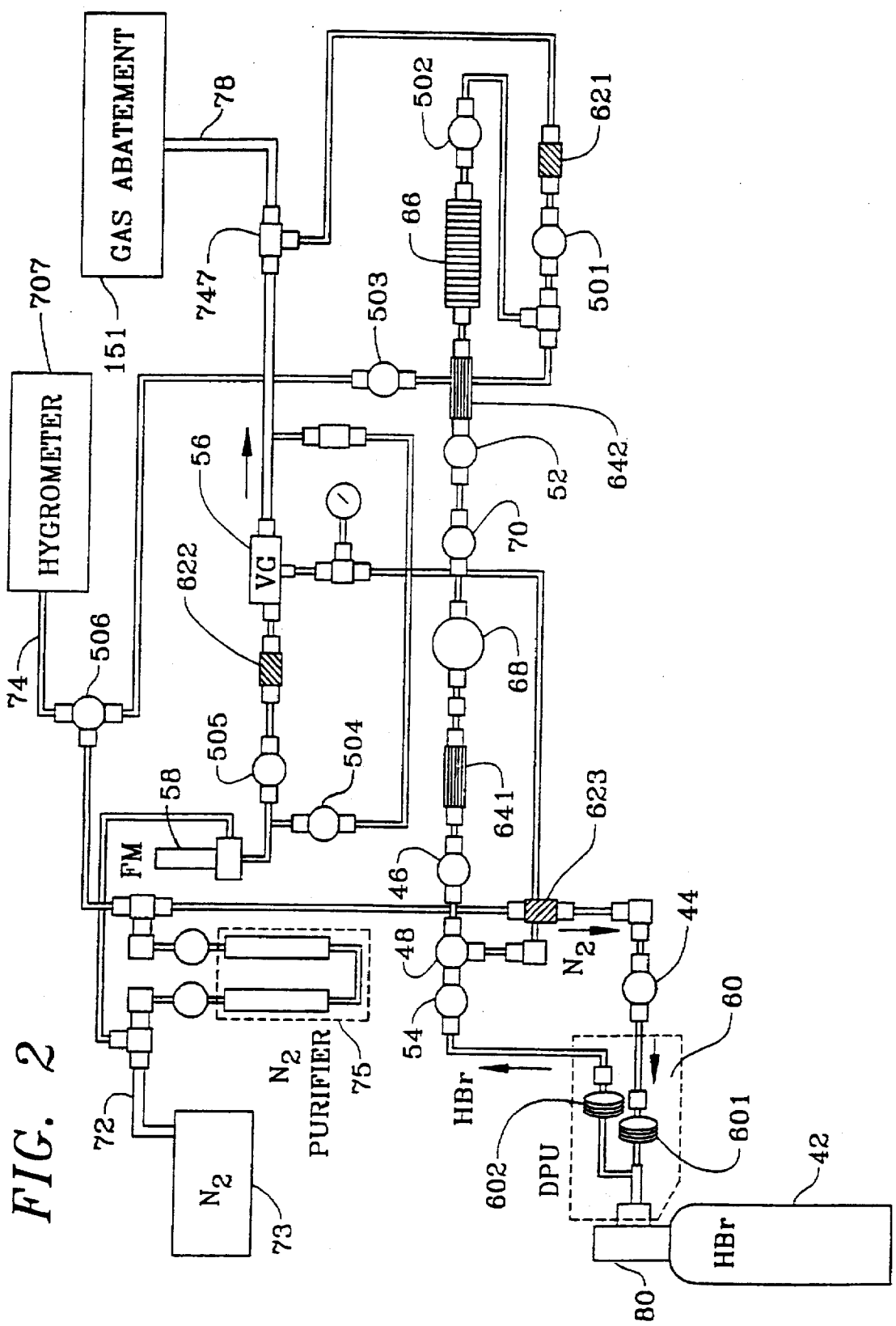
FIG. 2 is a schematic illustration of a gas flow distribution system incorporating the pressure regulator depicted in FIG. 1.

FIG. 2 generally illustrates various features associated with a corrosive gas distribution system incorporating the features of the present invention. The gas flow distribution system illustrated in FIG. 2 is useful in the context of delivering corrosive HBr gas to a semiconductor manufacturing facility. However, it is to be understood that the features of the present invention which are described in more detail below are equally applicable to any other type of corrosive gas or non-inert distribution systems which employ pressure regulators that are subject to malfunction or failure.

As illustrated in FIG. 2, a cylinder 42 of corrosive HBr gas is connected to the gas distribution system for purposes of providing a supply of HBr gas. The cylinder 42 is designed to be replaceable so that when the cylinder is emptied, another full cylinder can be connected to the system. The gas distribution system also includes several high pressure valves 44, 46, 48, several low pressure valves 501, 502, 503, 504, 505, 506, a low pressure air control valve 52, pressure sensors 54, 70 which measure the pressure of the corrosive gas HBr before and after the pressure regulator 68, a vacuum generator 56, a flow meter 58, a deep purge or cross purge unit 60, several check valves 621, 622, 623, several filters 641, 642 and a mass flow controller 66. A source of N$_2$ 73 is provided and is connected with the distribution system by way of a house line 72. The source 73 can be a liquid nitrogen storage with an evaporator or an on-site N$_2$ plant or N$_2$ gas in a cylinder, or any other N$_2$ generator means. A N$_2$ purifier is also connected to the incoming N$_2$ line 72 to deliver high purity or ultrahigh purity N$_2$ as required by the standards of the electronic industry. The various parts of the gas distribution system described above are interconnected with appropriate tubing (e.g., SUS 316L EP tubings and SUS 316L BA tubings) having different size diameters as illustrated in FIG. 2. The gas distribution system also includes a pressure regulator 68 which can be of the general form illustrated in FIG. 1 for reducing the pressure in the cylinder 42 to the working pressure.

The various high or low pressure valves, whether two port or three port valves, control the various gas flow in two directions (on or off) while the check valves allow the gas to flow only in one direction. The deep purge unit DPU 60 comprises two pigtails 601, 602 which are connected to the valve 80 of the cylinder 42 and which assist in the gas purging procedure during the HBr cylinder exchange. (The deep purge unit, DPU, can be replaced by a cross purge unit.) The vacuum generator 56 evacuates gas from the system to a gas abatement device 151 through the line 78. The flow meter 58 measures the nitrogen flow rate in the system. The operation of the system shown in FIG. 2 involves three basic steps, namely the initial dry down step, the HBr flow step, and the cylinder exchange simulation. Each of these steps is described below.

1. The initial dry down

During the initial dry down, the cylinder valve 80 and valves 48, 501, 504, 505 and 506 remain closed. $N_2$ gas flows through the purifier 75, valve 44, deep purge unit (DPU) 60 and valve 46 to the system and the moisture level of the purge $N_2$ is measured by a hygrometer 707 attached to the end of the line 74. When the moisture content in the $N_2$ reaches the required value, the $N_2$ flow stops. The purified $N_2$ (about 20 ppb $H_2O$) is necessary only for the initial dry down of the complete line. For purging of the deep purge unit 60 and the cylinder valve 80 during the cylinder change, a purified high grade $N_2$ is sufficient. A purified low grade $N_2$ is used for other purposes like pneumatic valve operation and dilution of corrosive gas before being sent to the gas abatement device 151.

2. HBr flow

During the HBr flow, (or any other non-inert gas or corrosive gas or reactive gas), the valves 44, 48, 503, 505 and 506 remain closed. The opening of the cylinder valve 80 initiates gas flow from the cylinder 42 to the system through the deep purge unit 60. The input pressure (P) of the gas (cylinder pressure) is measured by the pressure sensor (PS) 54. The pressure sensor 70 indicates the output pressure from the regulator 68. The mass flow controller 66 controls the gas flow rate. A gas with a constant pressure and flow rate flows to the gas abatement device 151 through the line 78. Nitrogen gas flows through the valve 504 and dilutes the HBr gas in the connection 747 prior to entering the gas abatement device 151.

3. Cylinder exchange simulation

This simulates the actual cylinder exchange in the corrosive gas system. During the cylinder exchange simulation, the cylinder valve 80 and valves 46, 502, 503, 504 and 506 remain closed. The opening of the valve 505 activates the vacuum generator 56 and then, opening of the valve 48 causes the removal of the HBr gas, which remained in the deep purge unit 60, the various cylinder valves, etc., the gas being sent to the gas abatement device 151. Then the purge gas ($N_2$) is introduced into the line disposed between the valves 44 and 48 by closing the valve 48 and opening the valve 44. Next, depressurizing the same part of the line is obtained by closing the valve 44 and opening the valve 48. (This procedure, known as cycle purge, is carried out several times). Then, the cylinder valve 80 is disconnected from the deep purge unit 60 and the opening of the valve 44 creates a $N_2$ flow from the pigtail bleed 601 to the atmosphere during the times the cylinder 42 is disconnected from the deep purge unit 60. After about 2 minutes (the actual time needed to exchange a cylinder) the valve 80 of the cylinder 42 is reconnected to the deep purge unit 60. Then, the atmospheric intrusion into the cylinder valve is removed by the same procedure that is used to remove the HBr at the beginning. The HBr flow can thereafter start again.

Figure 1:
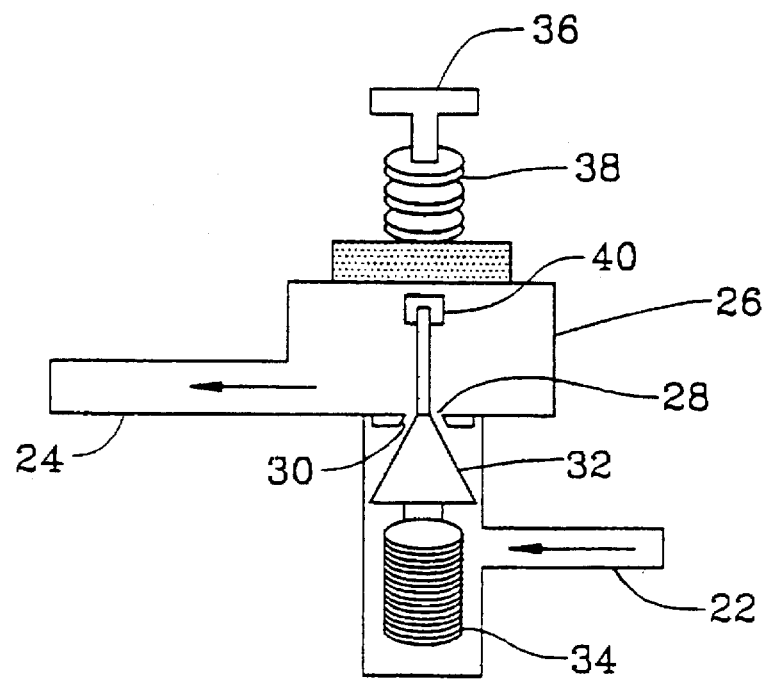
FIG. 1 is a schematic illustration of the various parts of a pressure regulator.
Figure 3:
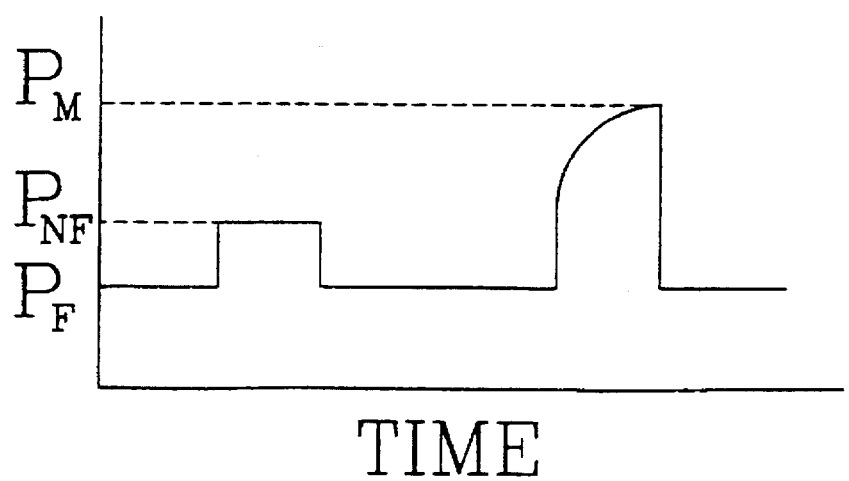
FIG. 3 is a graph illustrating the changes in pressure with respect to time during certain operating conditions of the pressure regulator illustrated in FIG. 1.

With reference to FIG. 3, it has been found that in a pressure regulator such as that illustrated in FIG. 1 which is in good operating condition (i.e., the pressure regulator is free of internal and external leaks), the output pressure $P_F$ is constant or substantially constant with time so long as gas is flowing through the gas distribution system. If the gas flow stops as a result of, for example, the closing of a valve downstream of the pressure regulator, the output pressure $P_{NF}$ of the pressure regulator increases slightly in comparison to that which is reached when gas is flowing and then once again remains constant or substantially constant with respect to time. However, if corrosion of the poppet 32 and/or the deposition of corrosion products on the poppet 32 occurs, and/or if the spring force of the poppet spring 34 weakens due to corrosion resulting from the flow of the highly corrosive gases, the output pressure of the regulator in the absence of gas flow increases gradually due to the fact that the poppet cannot tightly engage the seat 30 and completely close the restrictor orifice 28. If the maximum pressure reached during a certain time period is represented by $P_M$, then the condition of the regulator can be measured by the following expression:

$$\Delta P = P_M - P_F.$$

It has been discovered, therefore, that the operating condition of the pressure regulator can be assessed by continuously measuring the output pressure of the pressure regulator when gas is flowing through the system and in the absence of gas flow through the system, and monitoring the pressure differential $\Delta P$ that exists between the output pressure of the pressure regulator when gas is flowing through the system and the output pressure of the pressure regulator in the absence of gas flow.

To determine the specific parameters for assessing the operating condition of the pressure regulator, tests were performed to measure the pressure differential $\Delta P$ of the pressure regulator in connection with three gas distribution systems, each designed in the manner illustrated in FIG. 2. In addition to the components of the gas distribution system described above, each system was provided with a pressure sensor 70 positioned immediately downstream of the pressure regulator 68 to continuously measure the output pressure of the pressure regulator 68. The three systems were operated so as to simulate conditions which would likely result in three different conditions of the pressure regulator—a properly operating pressure regulator, a malfunctioning pressure regulator and a failed pressure regulator.

In each of the three test systems, an initial dry down procedure was performed. That is, a He leak test was initially carried out and all three systems were then purged with purified $N_2$ supplied from the house line 72. The usual range of flow rate for purging is between about 0.5 to about 10 standard liter per minute or SLM; where 1 SLM=0.167× $10^{-4}$ m³/s. The first test system was purged at 1 SLM with purified $N_2$ (<20 ppb $H_2O$) while baking at 70°–80° C. In contrast, the second and third systems were purged with purified $N_2$ (<20 ppb $H_2O$) at room temperature at the rate of 1 SLM. The moisture level of the purging $N_2$ was monitored by a hygrometer 707 allowing down to approximately 20 ppb $H_2O$ concentration measurement (e.g., an electrolytic hygrometer like those sold by MEECO, Inc.) and connected to an output line 74 of each system. After several days (i.e., 1–2 days) of purging, the moisture level of the $N_2$ gas reached 100 ppb at the end of the lines. The purging was then stopped and a flow of pulsed HBr gas, controlled by the pneumatic valve 52, was introduced into each of the three test systems. During this pulsed HBr gas flow, the output pressure of the pressure regulator 68 of each test system was recorded constantly by the pressure transmitter 70 both in the presence of gas flow and in the absence of gas flow. The gas flow rate was between 100 standard cubic centimeter per minute and 1000 standard cubic centimeter per minute.

As noted above, the process of exchanging a full gas cylinder for an empty gas cylinder, if not properly controlled, can be a major cause of the introduction of corrosion in the gas line due to the intrusion of moisture from the atmosphere. In order to simulate this cylinder exchange in each of the three test systems, a pigtail bleed of the deep purge unit 60 was disconnected from the cylinder valve, exposed to the ambient air for about two minutes and connected again to the cylinder every day. After the simulated cylinder exchange procedures were carried out for the three test systems, each system was subjected to a purging procedure. The purging procedure following the cylinder exchange for the third test system was different from the purging procedure used in connection with the first and second test systems as described in more detail below.

In the case of the first test system, the part of the system connecting the deep purge unit 60 to the high pressure valves 44, 46, including the cylinder valve 80, was purged cyclically with $N_2$ for five times in order to remove atmospheric contaminants introduced during the cylinder exchange. After this $N_2$ purge, the same part of the system was cycle purged with HBr for five times in order to further remove any contaminants. This procedure was adopted to minimize the intrusion of moisture to the system after the cylinder exchange and thereby reduce the potential for corrosion within the first test system.

In the case of the second test system, the purging procedure after the simulated cylinder exchange was the same as that used in connection with the first test system. The only difference between the first and second systems involved the initial dry down described above in which the first system was dried down with baking while the latter was not.

The $N_2$ cycle purge after the simulated cylinder exchange for the third test system was carried out in the same manner as that for the first and second test systems. However, the HBr purge after the $N_2$ cycle purge was not done. Therefore, the removal of contaminants that were introduced into the system during the cylinder change was not as efficient as in the case of the first system or the second system and so the extent of corrosion within the third system was significantly higher than in the case of the first and second systems.

Figure 4A:
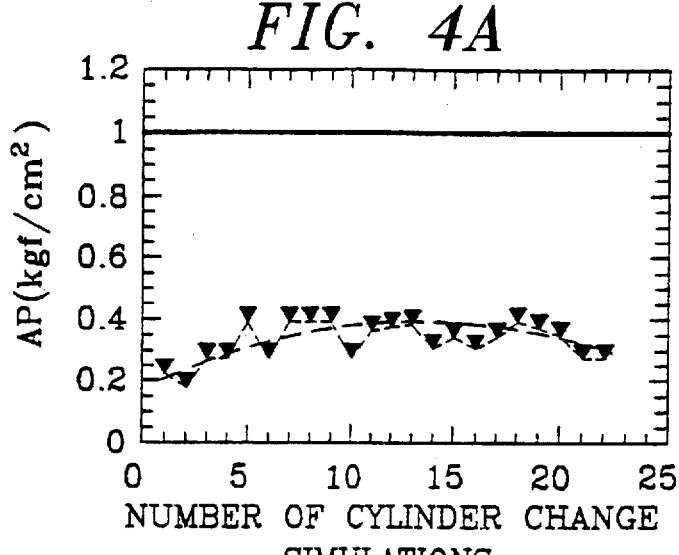
FIG. 4A is a graph illustrating changes in output pressure of the pressure regulator shown in FIG. 1 with respect to the number of cylinder changes in a properly operating pressure regulator.
Figure 4B:
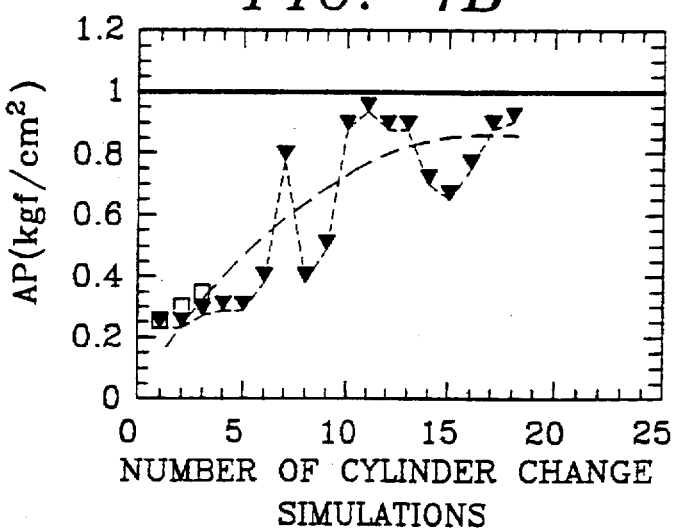
FIG. 4B is a graph illustrating changes in output pressure of the pressure regulator shown in FIG. 1 with respect to the number of cylinder changes in a malfunctioning pressure regulator.
Figure 4C:
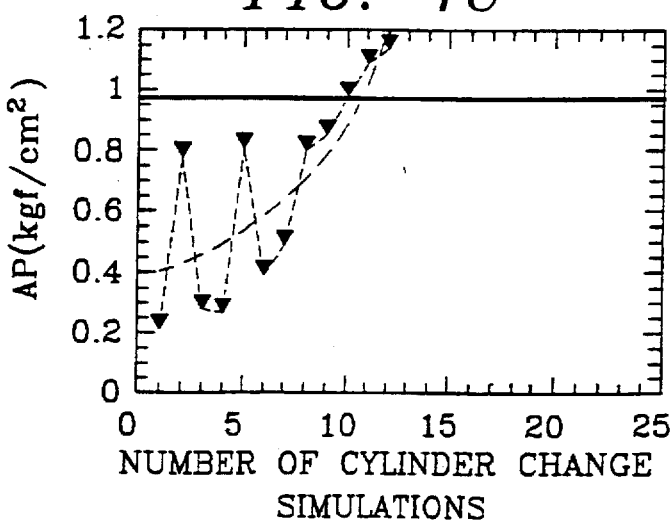
FIG. 4C is a graph illustrating changes in output pressure of the pressure regulator shown in FIG. 1 with respect to the number of cylinder changes in a failed pressure regulator.

After the foregoing operations were carried out for the three test systems (between twelve and twenty-four times as shown in FIGS. 4A, 4B, 4C), the pressure regulator 68 for each system was examined. The result of that examination clearly identified differences in the extent of corrosion due to the different initial dry down and purging procedures associated with the three systems. The pressure regulator from the first test system exhibited no corrosion or deposition of corrosion products on the poppet. Further, the poppet spring remained substantially corrosion free.

As measured by the pressure sensor 70, the pressure differential $\Delta P$ of the regulator 68 for the first test system fluctuated only very slightly, and remained small and nearly constant with the number of cylinder change simulations as illustrated in the graph of FIG. 4A. Even after twenty-four cylinder exchange simulations, the pressure regulator 68 exhibited no abnormality and the pressure differential $\Delta P$ was always less than about 0.5 kgf/cm$^2$ (1 kgf/cm$^2$= 9.806650×10$^4$ N/m$^2$).

The pressure differential $\Delta P$ of the pressure regulator 68 for the second test system fluctuated significantly, and gradually increased to about 0.9 kgf/cm$^2$ with the number of cylinder exchange simulations as illustrated in the graph of FIG. 4B. After twenty-one cylinder exchange simulations, the pressure differential $\Delta P$ was less than 1.0 kgf/cm$^2$. Although the pressure regulator 68 was still deemed usable, the high value of the pressure differential $\Delta P$ (about 0.9 kgf/cm$^2$) and the high fluctuations in the pressure differential $\Delta P$ indicated the onset of malfunction. Upon examination, the pressure regulator 68 from the second test system was found to have minor corrosion and minor deposition of corrosion products on the poppet which would tend to inhibit the leak tight closure of the restricted orifice 28 through engagement of the poppet 32 on the seat 30 of the pressure regulator. Also observed with respect to the pressure regulator 68 from the second test system was corrosion on the poppet spring 34 which would tend to inhibit or reduce the rebound ability of the poppet spring 34 in the absence of gas flow. This deposition of corrosion products on the poppet 32 and corrosion on the poppet spring 34 were deemed to be the causes of the observed fluctuations in the pressure differential $\Delta P$ with respect to time as illustrated in the graph of FIG. 4B.

The pressure differential $\Delta P$ of the pressure regulator 68 from the third test system fluctuated greatly and exceeded 1.0 kgf/cm$^2$ after only eleven cylinder change simulations as depicted in the graph of FIG. 4C. Here, the pressure regulator 68 failed ($\Delta P$>1.0 kgf/cm$^2$) much earlier than in the case of the pressure regulator for the first system. Upon examination, it was observed that the pressure regulator 68 from the third test system exhibited a heavy deposition of corrosion products on the poppet 32 and heavy corrosion of the poppet spring 34, both of which inhibit the leak tight closure of the restricted orifice 28 through full engagement of the poppet 32 with the seat 30 of the pressure regulator. This heavy deposition of corrosion products on the poppet 32 and the heavy corrosion of the poppet spring 34 were deemed to be the cause of the failure of the pressure regulator of the third test system through internal leak.

Based on the foregoing, it was discovered that the variation in pressure differential $\Delta P$ with respect to time depends quite strongly on the purging procedure associated with the cylinder exchange (i.e., with the corrosion level in the system, particularly the pressure regulator). For a corrosion free line, it was found that the pressure differential $\Delta P$ is quite small, on the order of less than 0.5 kgf/cm$^2$, and does not fluctuate with time. For a failed pressure regulator due to corrosion and/or deposition of corrosion products on the poppet 32, and/or due to the corrosion of the poppet spring 34, the pressure differential $\Delta P$ is quite large, on the order of greater than 1.0 kgf/cm$^2$, and gradually increases with time. Thus, the pressure differential $\Delta P$ can be regarded as an arbitrary unit for the indication of the operating condition of the pressure regulator in the following manner.

When $\Delta P$<0.5 kgf/cm$^2$ and does not fluctuate with time, the regulator is functioning normally.

When 0.5 kgf/cm$^2$<$\Delta P$<1 kgf/cm$^2$ and fluctuates greatly with time, the regulator is not functioning normally, indicating the onset of a malfunction.

When $\Delta P$>1 kgf/cm$^2$ and increases gradually, the regulator has failed due to an internal leak.

When the output pressure in the absence of gas flow decreases gradually, even very slightly, it indicates a leak to outside, i.e., an external leak.

Thus, in accordance with the present invention, the operating condition of a pressure regulator in a corrosive gas distribution system with respect to the presence or absence of internal or external leaks can be assessed by (continuously) monitoring or measuring the output pressure of the pressure regulator in the presence and absence of gas flow through the system. Knowing the output pressure of the pressure regulator when gas is flowing through the system and comparing that pressure to the output pressure of the regulator in the absence of gas flow to determine the magnitude of the pressure differential allows the operating condition of the regulator to be readily determined. This advantageously allows pressure regulator malfunctions to be detected at an early stage so that corrective action can be taken before the occurrence of a corrosive gas leakage. Thus, the safety as well as the productivity of the gas distribution system can be increased to a significant extent.

This technique can be used manually as well as in computerized gas distribution systems to predict malfunctions automatically and correct them prior to the occurrence of a potentially harmful accident. In the case of computerized gas distribution systems, the pressure differential ΔP and its variation with time can be automatically measured with the results being automatically fed to safety equipment so as to achieve safe and trouble free operation of the total corrosive gas distribution system.

In the case of a computerized cylinder cabinet, for example, the system according to the invention can be implemented as follows:

The gas distribution system in the cylinder cabinet provides gas with constant pressure (P) and the computer continuously monitors this pressure P (output pressure). The gas flow rate is controlled by the device, e.g., a reactor, connected to the gas distribution system in the cylinder cabinet.

Since the process according to the invention uses data on output pressure P both in the presence and absence of the gas flow, information on the gas flow is also sent to the computer in order to determine to which category (with or without gas flow) the measure done on the pressure P belongs. To make this information available to the computer of the gas cabinet, a gas flow meter may be installed at the outlet of the gas distribution system in the cylinder cabinet.

It is also possible, without installing a flow meter, to have, e.g., a signal sent by the device (e.g., the reactor) to the computer to indicate to the computer if the gas flows or not.

Having this information, the computer of the gas cabinet can continuously or from time to time calculate the ΔP between $P_F$ and the greater of $P_{NF}$ and $P_M$ as previously defined, in order to determine if the pressure regulator, or any other device tested the same way as explained hereabove, is functioning normally, is not functioning normally or has already failed. The computer can generate a print-out or any other light or sound signal as soon as the tested device (e.g., pressure regulator) has been determined to be malfunctioning. It is also well within the skills of one of ordinary skill in the art to provide a special alarm signal (sound, light, special print-out, separately or all together) in case of failure detection.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A method of detecting a malfunction or failure of a corrosion sensitive element due to a internal leak in a non-inert gas distribution system while in use, comprising:

flowing non-inert gas through said gas distribution system which is provided with a corrosion sensitive element;

determining an operating output pressure of the corrosion sensitive element in the gas distribution system while the non-inert gas is flowing through the system;

turning off the gas flow in the gas distribution system at a point downstream of the corrosion sensitive element;

measuring the output pressure of the corrosion sensitive element in the absence of gas flow through the gas distribution system;

determining the existence of a malfunction or failure of the corrosion sensitive element when the output pressure of the corrosion sensitive element in the absence of gas flow exceeds the operating output pressure of the corrosion sensitive element in the presence of gas flow and when a pressure differential between the operating output pressure of the corrosion sensitive element in the presence of gas flow and the output pressure of the corrosion sensitive element in the absence of gas flow exceeds a predetermined value.

2. Method according to claim 1, wherein said step of determining the existence of a malfunction or failure of the corrosion sensitive element includes determining the onset of a malfunction of the corrosion sensitive element when said pressure differential exceeds said predetermined value which is a first predetermined value, and determining that a failure of the corrosion sensitive element has occurred when said pressure differential exceeds a second predetermined value that is greater than the first predetermined value.

3. Method according to claim 1, wherein said predetermined value is 0.5 kgf/cm$^2$ and said step of determining the existence of a malfunction or failure of the corrosion sensitive element includes determining the existence of a malfunction of the corrosion sensitive element when said pressure differential is between of 0.5 kgf/cm$^2$ and 1.0 kgf/cm$^2$.

4. Method according to claim 1, wherein said predetermined value is 1.0 kgf/cm$^2$ and said step of determining the existence of a malfunction or failure of the corrosion sensitive element includes determining the existence of a failure of the corrosion sensitive element when said pressure differential is greater than 1.0 kgf/cm$^2$.

5. Method according to claim 1, wherein the non-inert gas is selected from the group consisting of corrosive and reactive gases.

6. A method of assessing the operating condition of a corrosive or reactive non-inert gas distribution system that includes a mass flow controller and a pressure regulator for regulating gas pressure, the pressure regulator having an outlet and being positioned upstream of the mass flow controller with respect to the direction of gas flow, and a line connecting the pressure regulator with the mass flow controller, comprising flowing non-inert gas through the gas distribution system so that the non-inert gas flows through the pressure regulator, stopping gas flow through the gas distribution system at a point downstream of the pressure regulator, monitoring the outlet pressure adjacent the outlet of the pressure regulator during flow of non-inert gas through the line and in the absence of gas flow through the line, and determining the operating condition of the system based on changes in the outlet pressure of the pressure regulator in the absence of gas flow through the line.

7. Method according to claim 6, wherein said step of determining the operating condition of the system includes determining that the system is malfunctioning if a pressure differential between the outlet pressure of the pressure regulator when the gas is flowing through the line and the outlet pressure of the pressure regulator in the absence of gas flow exceeds a first predetermined value.

8. Method according to claim 7, wherein said step of determining the operating condition of the system includes determining that the system has failed if a pressure differential between the outlet pressure of the pressure regulator when gas is flowing through the line and the outlet pressure of the pressure regulator in the absence of gas flow exceeds a second predetermined value which is at least equal to said first predetermined value.

9. A method according to claim 8, wherein said second predetermined value is greater than 1.0 kgf/cm$^2$.

10. A method according to claim 7, wherein said first predetermined value is comprised between 0.5 kgf/cm$^2$ and 1.0 kgf/cm$^2$.

11. A method for assessing the operating condition of a pressure regulator in a non-inert gas distribution system which regulates gas pressure, the pressure regulator having an outlet, comprising flowing non-inert gas through the gas distribution system, stopping the flow of non-inert gas through the gas distribution system at a point downstream of the pressure regulator, determining the gas pressure adjacent the outlet of the pressure regulator downstream of the pressure regulator both during the flow of non-inert gas through the gas distribution system and in the absence of gas flow through the gas distribution system when the flow of non-inert gas has been stopped, identifying the existence of a malfunction or failure in the pressure regulator when the gas pressure adjacent the outlet in the absence of gas flow is greater by a predetermined value than the gas pressure adjacent the outlet during the flow of non-inert gas through the gas distribution system.

12. Method according to claim 1, wherein said step of flowing non-inert gas through said gas distribution system includes flowing a gas other than air.

13. Method according to claim 6, wherein said step of flowing non-inert gas through said gas distribution system includes flowing a gas other than air.

14. Method according to claim 11, wherein said step of flowing non-inert gas through said gas distribution system includes flowing a gas other than air.

* * * * *